US012782258B2

(12) United States Patent
Mou et al.

(10) Patent No.: US 12,782,258 B2
(45) Date of Patent: Nov. 3, 2026

(54) DETECTION ACCURACY ENHANCING STRUCTURE OF PARTICLE DETECTING MODULE

(71) Applicant: Microjet Technology Co., Ltd., Hsinchu (TW)

(72) Inventors: Hao-Jan Mou, Hsinchu (TW); Chin-Chuan Wu, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 144 days.

(21) Appl. No.: 18/893,210

(22) Filed: Sep. 23, 2024

(65) Prior Publication Data

US 2025/0172474 A1 May 29, 2025

(30) Foreign Application Priority Data

Nov. 24, 2023 (TW) ................................ 112145575

(51) Int. Cl.
*G01N 15/0205* (2024.01)
*G01N 15/075* (2024.01)

(52) U.S. Cl.
CPC ....... *G01N 15/0211* (2013.01); *G01N 15/075* (2024.01)

(58) Field of Classification Search
CPC ............. G01N 15/0211; G01N 15/075; G01N 2015/1486; G01N 15/1459; G01N 15/06; G01N 2015/0046; G01N 15/0205; G01N 21/01; G01N 2021/0112
See application file for complete search history.

(56) References Cited

U.S. PATENT DOCUMENTS

| | | | | |
|---|---|---|---|---|
| 4,895,034 A * | 1/1990 | Poole | ...................... | G01N 15/02 73/865.5 |
| 7,443,078 B1 * | 10/2008 | DuBrucq | ............... | B63H 25/24 310/330 |

(Continued)

FOREIGN PATENT DOCUMENTS

| | | | |
|---|---|---|---|
| CN | 107063951 A * | 8/2017 | ............. F24F 11/30 |
| CN | 207263579 U | 4/2018 | |

(Continued)

*Primary Examiner* — Mohamed K Amara
(74) *Attorney, Agent, or Firm* — Birch, Stewart, Kolasch & Birch, LLP

(57) ABSTRACT

A detection accuracy enhancing structure of a particle detecting module is provided. A detection accuracy enhancing structure comprises an anti-scatter structure and two stray light suppression treatment structures. The anti-scatter structure is disposed in the gas-inlet groove of the base corresponding to a projection area of the laser component. The two stray light suppression treatment structures are respectively arranged in the light trapping region and the gas-inlet groove corresponding to the projection area of the laser component. When the light beam emitted from the laser component is reflected to the light trap region and the gas-inlet groove, the anti-scatter structure and the two stray light suppression treatment structures reduce a stray light directly reflected to the particulate sensor, so as to enhance the detection accuracy.

4 Claims, 12 Drawing Sheets

(56) References Cited

U.S. PATENT DOCUMENTS

| | | | | |
|---|---|---|---|---|
| 2014/0271277 | A1 * | 9/2014 | Whalen | F04F 7/00 29/25.35 |
| 2017/0023457 | A1 | 1/2017 | Hart et al. | |
| 2017/0268994 | A1 * | 9/2017 | Kawai | G01N 21/05 |
| 2017/0370809 | A1 | 12/2017 | Miller-Lionberg et al. | |
| 2022/0381655 | A1 * | 12/2022 | Tashiro | G01N 15/1484 |
| 2025/0237591 | A1 * | 7/2025 | Mou | G01N 33/0009 |

FOREIGN PATENT DOCUMENTS

| | | | | | |
|---|---|---|---|---|---|
| CN | 209069775 | U | | 7/2019 | |
| CN | 112585447 | A | | 3/2021 | |
| CN | 114674731 | A | | 6/2022 | |
| CN | 114813487 | A | | 7/2022 | |
| CN | 110873686 | B | | 2/2023 | |
| CN | 219161928 | U | | 6/2023 | |
| EP | 4119924 | A1 | | 1/2023 | |
| JP | 2004-69450 | A | | 3/2004 | |
| JP | 2007247510 | A | * | 9/2007 | F04B 23/08 |
| JP | 6542385 | B2 | * | 7/2019 | G01N 21/53 |
| TW | M552576 | U | | 12/2017 | |
| TW | M561788 | U | | 6/2018 | |
| TW | M562892 | U | | 7/2018 | |
| TW | M562968 | U | | 7/2018 | |
| TW | M565305 | U | | 8/2018 | |
| TW | M574686 | U | | 2/2019 | |
| TW | I678524 | B | | 12/2019 | |
| TW | 202127392 | A | | 7/2021 | |
| WO | WO 2016/105555 | A1 | | 6/2016 | |
| WO | WO-2019044250 | A1 | * | 3/2019 | G01N 15/02 |

* cited by examiner

DETECTION ACCURACY ENHANCING STRUCTURE OF PARTICLE DETECTING MODULE

CROSS-REFERENCE TO RELATED APPLICATION

This application claims priority to Taiwan Patent Application No. 112145575, filed on Nov. 24, 2023. The entire contents of the above-mentioned patent application are incorporated herein by reference for all purposes.

FIELD OF THE INVENTION

The present disclosure relates to a particle detecting module, and more particularly to a detection accuracy enhancing structure of particle detecting module with extremely thin structure.

BACKGROUND OF THE INVENTION

Suspended particulates refer to solid particles or liquid droplets present in the air. Due to their extremely fine particle size, the suspended particles may enter the lungs of human body through the nasal hair in the nasal cavity easily, causing inflammation in the lungs, asthma or cardiovascular disease. If other pollutants are attached to the suspended particles, it will further increase the harm to the respiratory system. In recent years, the problem of air pollution is getting worse. In particular, the concentration of particle matters (e.g., PM2.5) is often too high. Therefore, the monitoring to the concentration of the gas suspended particles is taken seriously. However, the gas flows unstably due to variable wind direction and air volume, and the general gas-quality monitoring station is located in a fixed place. Under this circumstance, it is impossible for people to check the concentration of suspended particles in current environment. Thus, a miniature and portable particle detecting module is needed for allowing the user to check the concentration of surrounding suspended particles anytime and anywhere.

More specifically, the present particle detecting module is disclosed in Taiwan Patent Application No. 107130404. In the particle detecting module, it is difficult to reduce the volume of the housing due to the limitations of the size of the gas-guiding component and the internal gas flow channel. For example, gas in a gas-guiding path is introduced from the inlet in the upper level and then flows downwardly to the lower level, a detection is performed. Then, the detected gas is transported through a micro pump, flows back to the upper level and is discharged through the outlet finally. In the structure of the conventional gas-guiding channel, the gas-guiding path is designed in multiple layers, which is complex and thicker. It is difficult to reduce the entire thickness of the particle detecting module, and it is more difficult to implement the conventional particle detecting module on a miniaturized mobile device or other portable electronic devices. Therefore, how to make the particle detecting module thinner and lighter is a problem that urgently needs to be solved.

In this circumstance, since the particle detecting module is designed to be light and thin, the detection accuracy of laser detection of the suspension particles will also be affected by the reduction in volume. Therefore, the main subject of the present disclosure is to maintain the light and thin design of the particle detecting module without affecting the accuracy of laser detection.

SUMMARY OF THE INVENTION

An object of the present disclosure provides a detection accuracy enhancing structure of a particle detecting module. The detection accuracy enhancing structure comprises an anti-scatter structure and two stray light suppression treatment structures. The anti-scatter structure is disposed in the gas-inlet groove of the base corresponding to a projection area of the laser component. The two stray light suppression treatment structures are respectively arranged in the light trapping region and the gas-inlet groove corresponding to the projection area of the laser component. Thus, the improvement of the present invention would benefit the scattered light spots of the suspended particles are more easily to be received and calculated by the particulate sensor for obtaining the sizes and the concentration information of the suspended particles contained in the gas. Consequently, the detection accuracy is improved without distortion, and is helpful of improving the detection efficiency of the particulate sensor.

In accordance with an aspect of the present disclosure, a detection accuracy enhancing structure of a particle detecting module is provided. The particle detecting module comprises a base, a piezoelectric actuator, a driving circuit board, a laser component, a particulate sensor and an outer cover. Wherein, the base has a gas-inlet groove, a gas-outlet groove, and a light trapping region. An inlet path is defined by the gas-inlet groove and an outlet path is defined by the gas-outlet groove. The light trapping region is spatially corresponding to a light beam path emitted from the laser component. Two transparent windows penetrate two lateral walls of the gas-inlet groove and are spatially corresponding to the light beam path, so that the light beam emitted from the laser component passes through the two transparent windows and enters the light trapping region. The detection accuracy enhancing structure comprising an anti-scatter structure and two stray light suppression treatment structures. The anti-scatter structure is disposed in the gas-inlet groove of the base corresponding to a projection area of the laser component. Two stray light suppression treatment structures are respectively arranged in the light trapping region and the gas-inlet groove corresponding to the projection area of the laser component. When the light beam emitted from the laser component is reflected to the light trap region and the gas-inlet groove, the anti-scatter structure and the two stray light suppression treatment structures reduce a stray light directly reflected to the particulate sensor to prevent detection distortion.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1A:
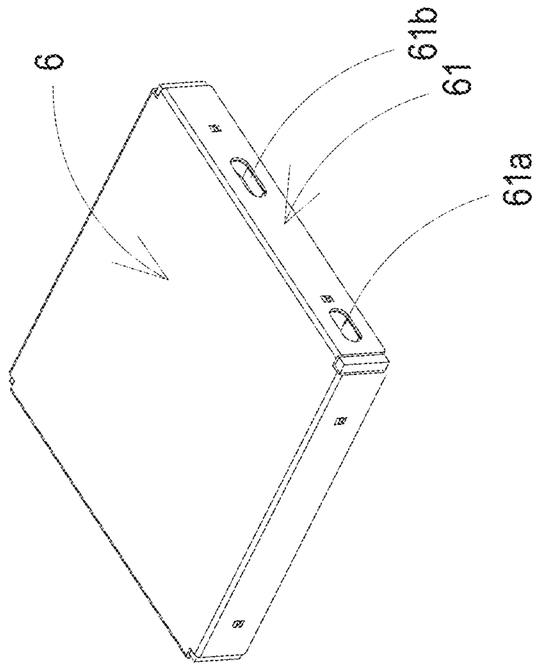
FIG. 1A is a schematic exterior view illustrating a particle detecting module according to an embodiment of the present disclosure.
Figure 1B:
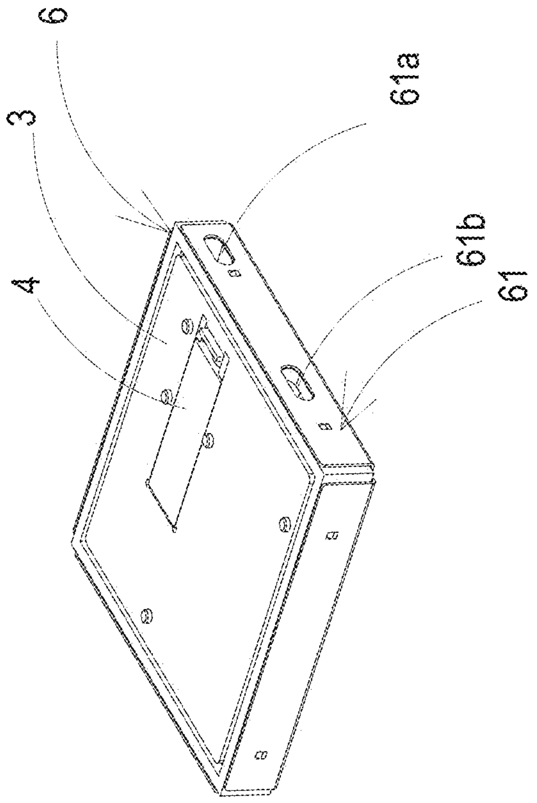
FIG. 1B is a schematic exterior view illustrating the particle detecting module according to the embodiment of the present disclosure and taken from another perspective angle.

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Please refer to FIG. 1A, FIG. 1B, FIG. 2 and FIG. 3. The present disclosure provides a particle detecting module including a base 1, a piezoelectric actuator 2, a driving circuit board 3, a laser component 4, a particulate sensor 5 and an outer cover 6. The driving circuit board 3 covers and is attached to the second surface 12 of the base 1, and the laser component 4 is positioned and disposed on the driving circuit board 3, and is electrically connected to the driving circuit board 3. The particulate sensor 5 is positioned and disposed on the driving circuit board 3, and is electrically connected to the driving circuit board 3. The outer cover 6 covers the base 1 and is attached to the second surface 12 of the base 1. Moreover, the outer cover 6 includes a side plate 61. The side plate 61 includes an inlet opening 61*a* and an outlet opening 61*b*.

Figure 3:
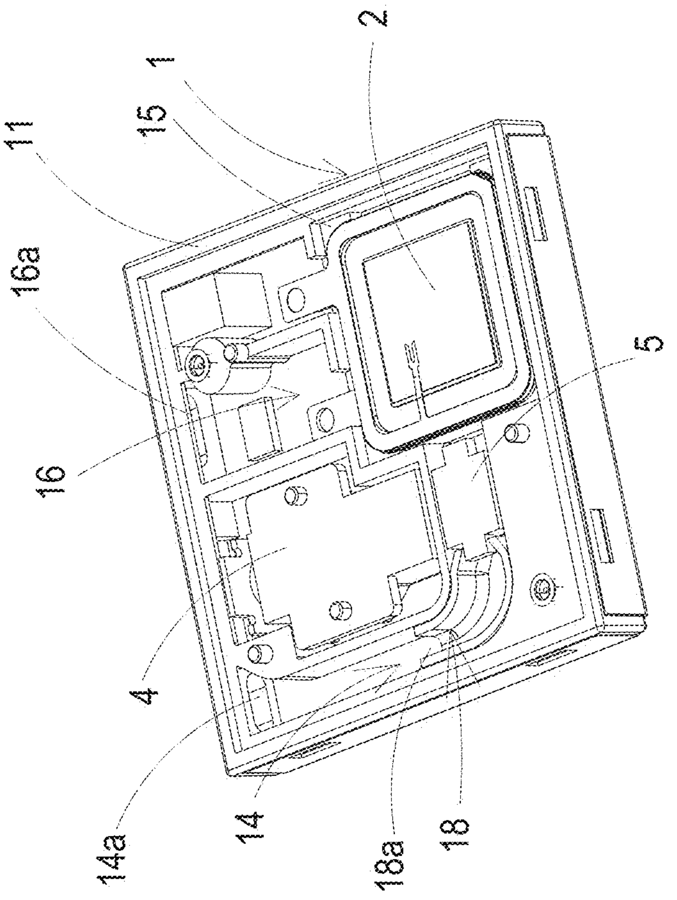
FIG. 3 is a schematic perspective view illustrating a detection accuracy enhancing structure disposed in a base of the particle detecting module of the present disclosure.
Figure 4:
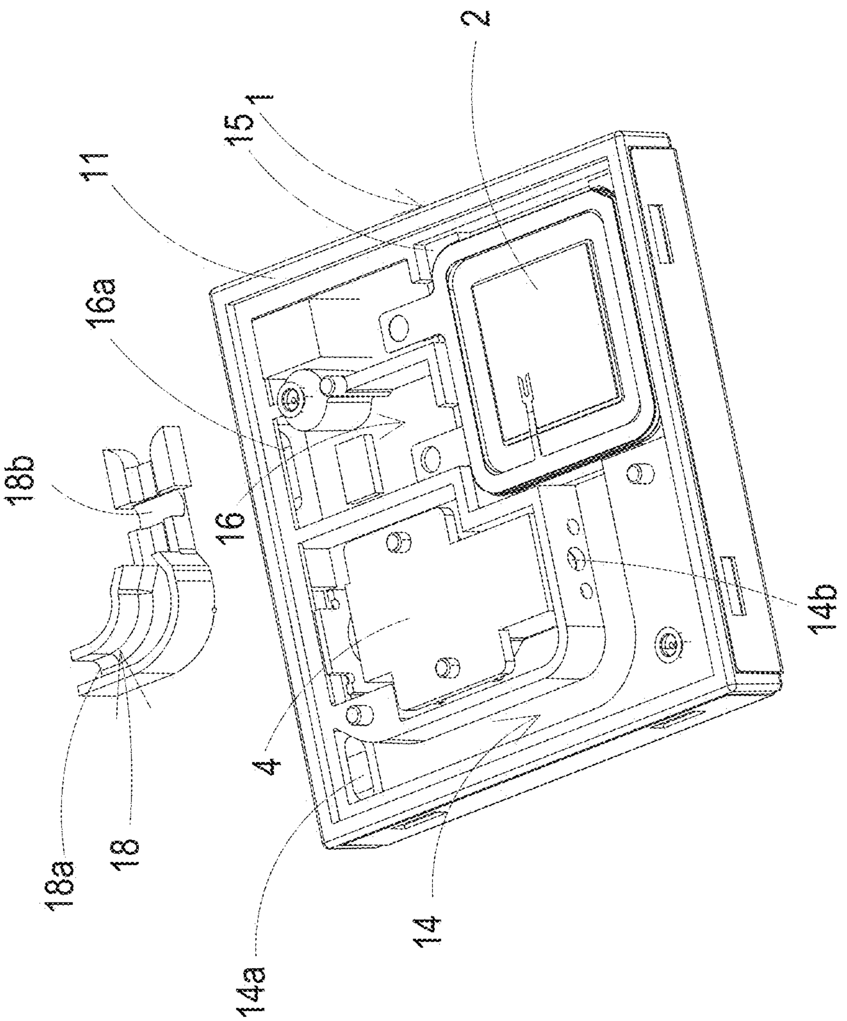
FIG. 4 is a schematic perspective view illustrating the detection accuracy enhancing structure separated from the base of the particle detecting module of the present disclosure.
Figure 5:
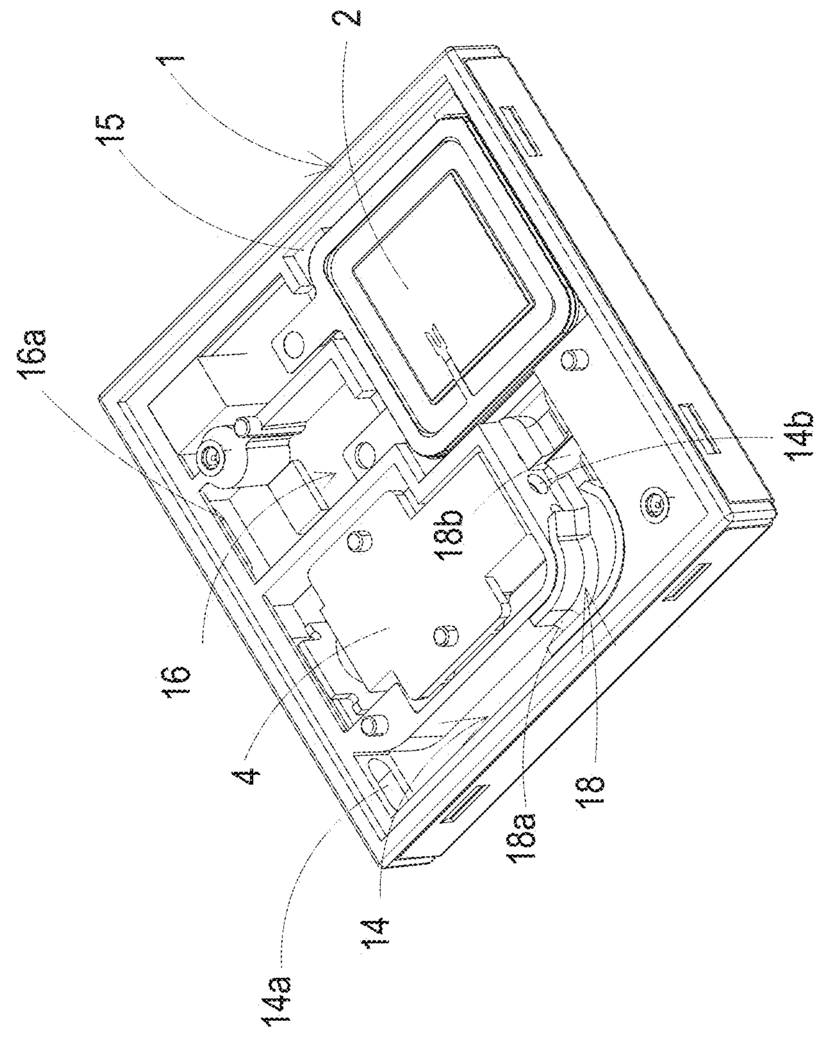
FIG. 5 is a schematic perspective view illustrating the detection accuracy enhancing structure combined with the base of the particle detecting module of the present disclosure.

Please refer to FIG. 3, FIG. 4 and FIG. 5. In the embodiment, the base 1 includes a first surface 11, a second surface 12, a laser loading region 13, a gas-inlet groove 14, a gas-guiding-component loading region 15 and a gas-outlet groove 16. In order to describe the positions of the laser component 4 and the particulate sensor 5 in the base 1, the driving circuit board 3 is specifically omitted in FIG. 3 to explain clearly. In this embodiment, the gas-inlet groove 14 includes a gas-inlet 14*a*, two lateral walls and two transparent windows 14*b*. The gas-inlet 14*a* is in fluid communication with an environment outside the base 1 and spatially corresponds to the inlet opening 61*a* of the outer cover 6. The two lateral walls are disposed adjacent to the laser loading region 13 and are penetrated by the two transparent windows 14*b*, respectively. A ventilation hole 15*a* penetrates a bottom surface of the gas-guiding-component loading region 15, and is in fluid communication with the gas-inlet groove 14, and is also in fluid communication with a gas-outlet 16*a* of the gas-outlet groove 16. In the embodiment, the gas-outlet 16*a* spatially corresponds to the outlet opening 61*b* of the outer cover 6. In that, the second surface 12 of the base 1 is attached and covered by the outer cover 6, and the first surface 11 of the base 1 is attached and covered by the driving circuit board 3, so that an inlet path is defined by the gas-inlet groove 14, and an outlet path is defined by the gas-outlet groove 16.

Please refer to FIG. 2, FIG. 3, FIG. 4 and FIG. 5. The laser component 4 is accommodated in the laser loading region 13 of the base 1, and the particulate sensor 5 is accommodated in the gas-inlet groove 14 of the base 1 and aligned to the laser component 4. In addition, the laser component 4 spatially corresponds to the transparent window 14*b*, a light beam emitted by the laser component 4 passes through the transparent window 14*b* and is irradiated into the gas-inlet groove 14. The light beam path emitted from the laser component 4 passes through the transparent window 14*b* and extends in a direction perpendicular to the gas-inlet groove 14, thereby forming an orthogonal direction with the gas-inlet groove 14. In the embodiment, the light beam emitted from the laser component 4 passes through the transparent window 14*b* and enters the gas-inlet groove 14, and suspended particles contained in the gas passing through the gas-inlet groove 14 is irradiated by the light beam. When the suspended particles contained in the gas are irradiated to generate scattered light spots, the scattered light spots are received and calculated by the particulate sensor 5 for obtaining related information about the sizes and the concentration of the suspended particles contained in the gas. In the embodiment, the particulate sensor 5 is a PM2.5 sensor.

Figure 9A:
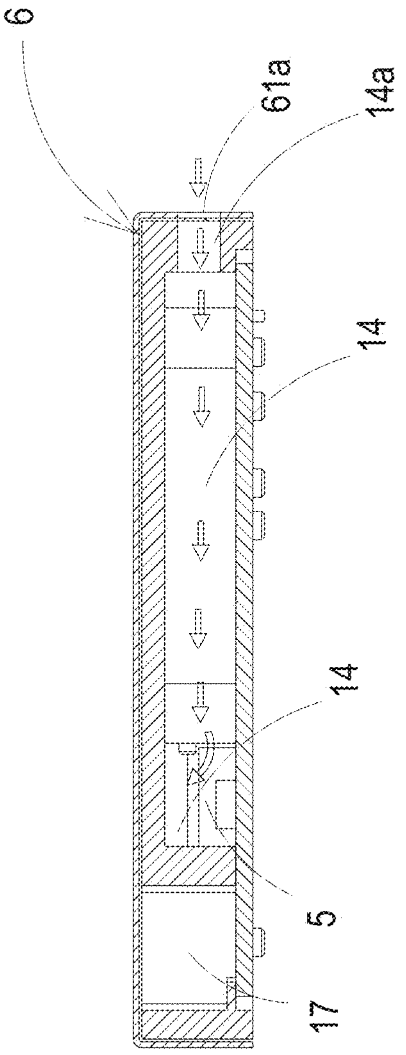
FIGS. 9A to 9C schematically illustrate the actions of the MEMS pump forming an inlet path and an outlet path in the base.
Figure 9B:
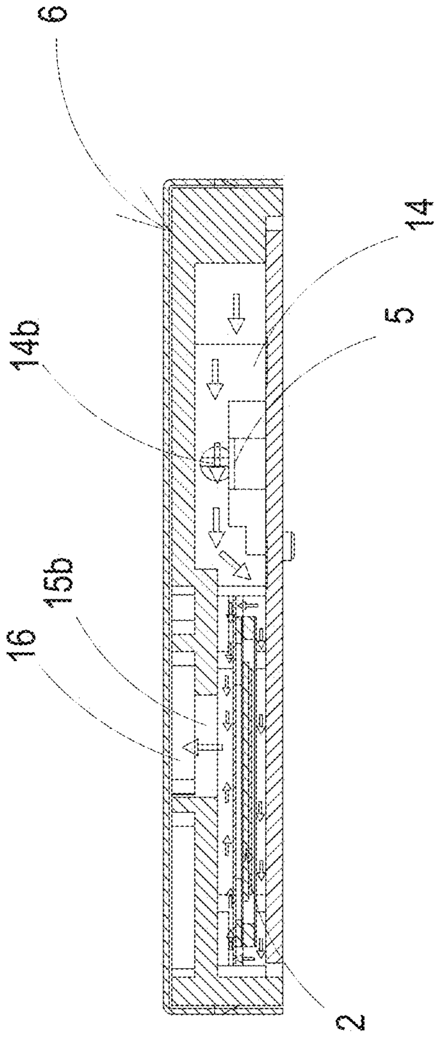
Figure 9C:
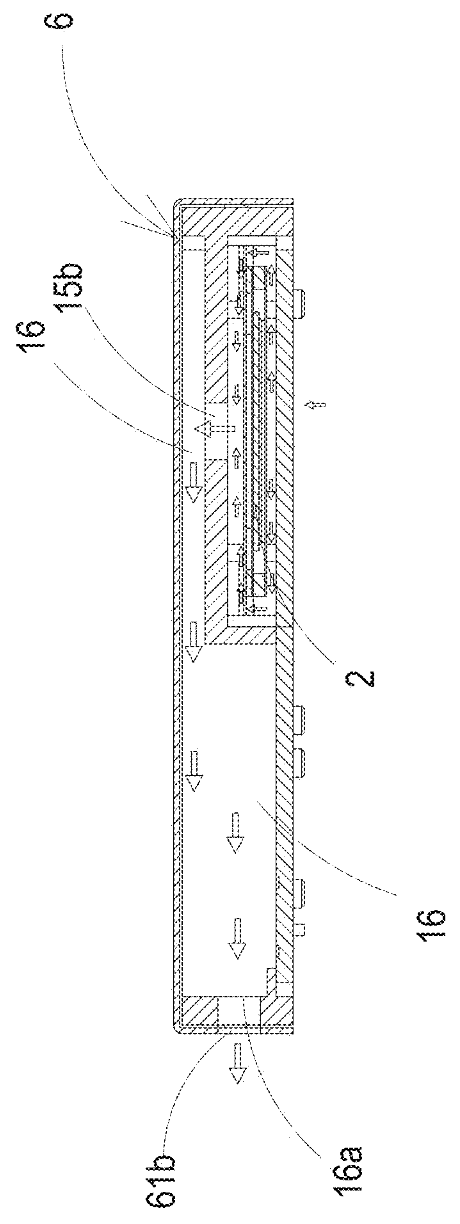

Please refer to FIGS. 9A to 9C. Firstly, as shown in FIG. 9A, the gas is inhaled through the inlet opening 61*a* of the outer cover 6, flows into the gas-inlet groove 14 of the base 1 through the gas-inlet 14*a*, and is transported to the position of the particulate sensor 5. Further as shown in FIG. 9B, the piezoelectric actuator 2 is enabled continuously to inhale the gas in the inlet path, and it facilitates the gas to be introduced rapidly, flow stably, and be transported above the particulate sensor 5. At this time, a light beam emitted from the laser component 4 passes through the transparent window 14*b* to irritate the suspended particles contained in the gas flowing above the particulate sensor 5 in the gas-inlet groove 14. When the suspended particles contained in the gas are irradiated to generate scattered light spots, the scattered light spots are received and calculated by the particulate sensor 5 for obtaining related information about the sizes and the concentration of the suspended particles contained in the gas. Moreover, the gas above the particle sensor 5 is continuously driven and transported by the piezoelectric actuator 2, flows into the ventilation hole 15*a* of the gas-guiding-component loading region 15, and is transported to the gas-outlet groove 16. As shown in FIG. 9C, after the gas flows into the gas-outlet groove 16, the gas is continuously transported and pushed to discharge out through the gas-outlet 16*a* and the outlet opening 61*b* by the piezoelectric actuator 2.

Figure 8:
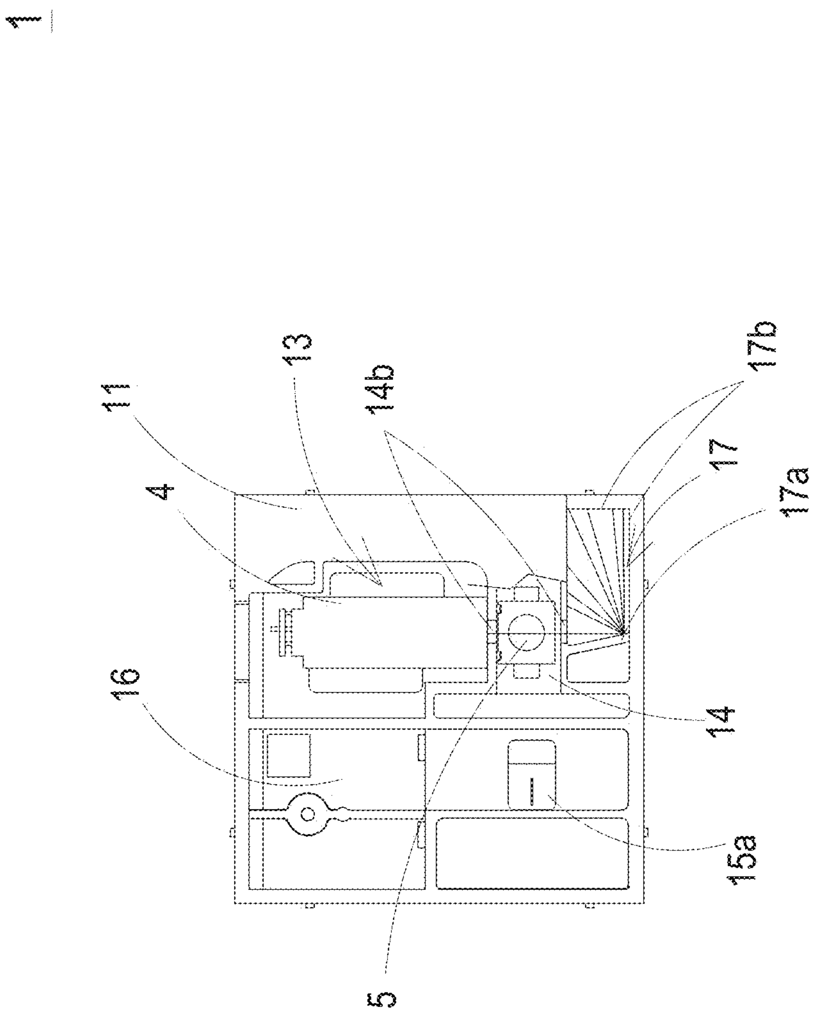
FIG. 8 schematically illustrates a light beam path emitted from the laser component.

As shown in FIG. 8, the base 1 further includes a light trapping region 17. The light trapping region 17 is spatially corresponds to the laser loading region 13. In the embodiment, the light trapping region 17 is corresponding to the transparent window 14*b* so that the light beam emitted by the laser component 4 is projected into the light trapping region 17. The light trapping region 17 includes a light trapping structure 17*a* and a side frame 17*b*. In the embodiment, the light trapping structure 17*a* has an oblique cone surface, and spatially corresponds to the light beam path emitted from the laser component 4.

Figure 6:
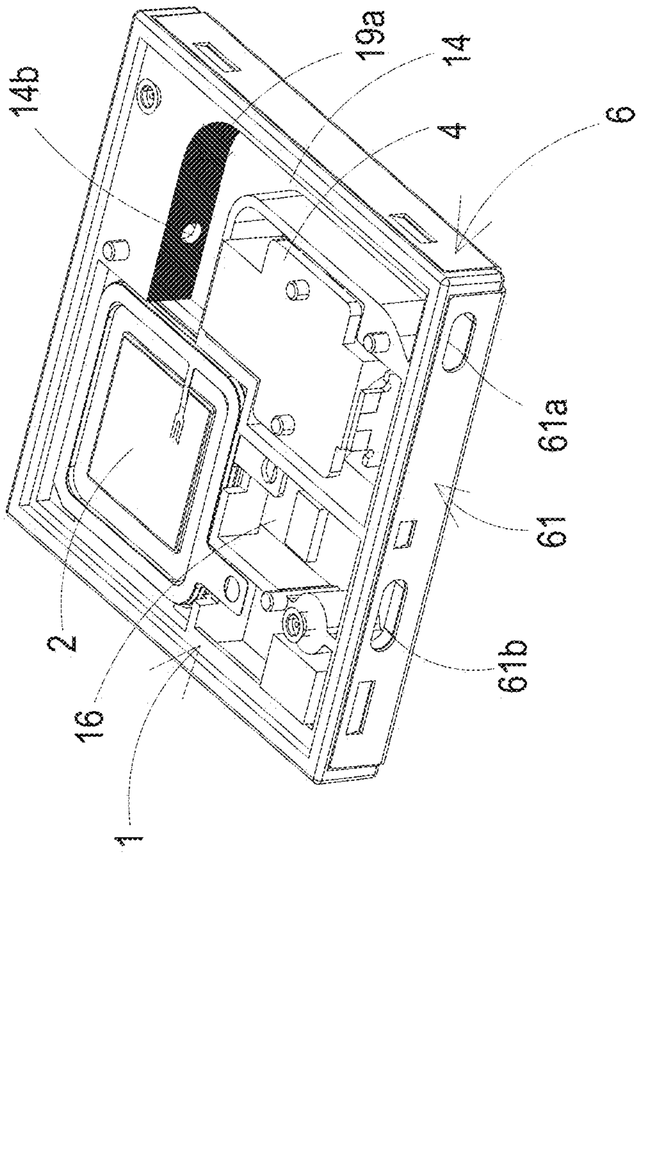
FIG. 6 is a schematic perspective view illustrating a reflective material coating in a gas-inlet groove of the base corresponding to a projection area of a laser component.
Figure 7:
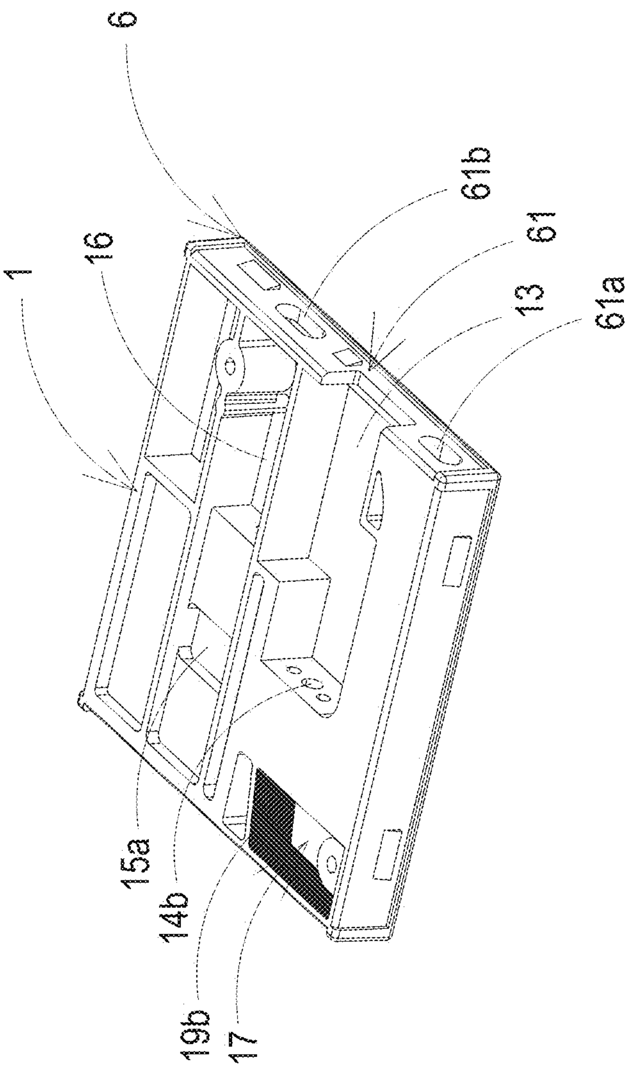
FIG. 7 is a schematic perspective view illustrating the reflective material coating in a light trapping region of the base.

As described above, the particle detecting module of the present disclosure is designed to have a proper configuration of the laser loading region 13, the gas-inlet groove 14, the gas-guiding-component loading region 15 and the gas-outlet groove 16 on the base 1. The base 1 is further matched with the outer cover 6 and the driving circuit board 3 to achieve the sealing design. In that, the second surface 12 of the base 1 is covered with the outer cover 6, and the first surface 11 of the base 1 is covered with the driving circuit board 3, so that the inlet path is defined by the gas-inlet groove 14, and the outlet path is defined by the gas-outlet groove 16. The gas flowing path is formed in one layer. It facilitates the particle detecting module to reduce the thickness of the overall structure, and to achieve the combination of a miniaturized portable electronic device or the combination of a miniaturized mobile device. It is easy for users to carry to detect the concentration of suspended particles in the surrounding environment. In this circumstance, since the particle detecting module is designed to be light and thin, the detection accuracy of laser detection of the suspension particles will also be affected by the reduction in volume. In order to maintain the light and thin design of the particle detecting module without affecting the accuracy of laser detection, the present disclosure provides a detection accuracy enhancing structure of the particle detecting module. As shown in FIG. 6 and FIG. 7, the base 1 of the particle detecting module has a gas-inlet groove 14 defining an inlet path, a gas-outlet groove 16 defining an outlet path, and a light trapping region 17 corresponding to a light beam path emitted from the laser component 4. Two transparent windows **14*b* penetrate two lateral walls of the gas-inlet groove 14 and are spatially corresponding to the light beam path, so that the light beam emitted from the laser component 4 passes through the two transparent windows 14 and enters the light trapping region 17. In this embodiment, the detection accuracy enhancing structure of the particle detecting module comprises an anti-scatter structure 18 and two stray light suppression treatment structures 19*a*, 19*b*. As shown in FIGS. 3 to 5, the anti-scatter structure 18 is disposed in the gas-inlet groove 14 of the base 1 corresponding to a projection area of the laser component 4. As shown in FIGS. 6 to 7, the two stray light suppression treatment structures 19*a*, 19*b* are respectively arranged in the light trapping region 17 and the gas-inlet groove 14 corresponding to the projection area of the laser component 4. Accordingly, when the light beam emitted from the laser component 4 is reflected to the light trap region 17 and the gas-inlet groove 14, the anti-scatter structure 18 and the two stray light suppression treatment structures 19*a*, 19*b* reduce the stray light directly reflected to the particulate sensor 5** to prevent detection distortion.

Please refer to FIGS. 3 to 5, the anti-scatter structure 18 is a trough-shaped frame with a corner. In the embodiment, the anti-scatter structure 18 has a shrink opening **18*a* and a channel having a reflective structure 18*b*, and the reflective structure 18*b* corresponds to the particulate sensor 5. The shrink opening 18*a* is arranged at a front end for accelerating the transportation and guidance of gas from the gas-inlet groove 14. Moreover, the shrink opening 18*a* is also provided for concentrating the suspended particles contained in the gas to pass the direction perpendicular to the gas-inlet groove 14 and the light beam path emitted from the laser component 4 passing through the transparent window 14*b*. Preferably but not exclusively, the reflective structure 18*b* facilitates to reflect the suspended particles contained in the gas to the surface of the particulate sensor 5, so that the scattered light spots of the suspended particles are easily to be received and calculated by the particulate sensor 5** for obtaining related information about the sizes and the concentration of the suspended particles contained in the gas. Consequently, the detection accuracy is improved without distortion.

Figure 2:
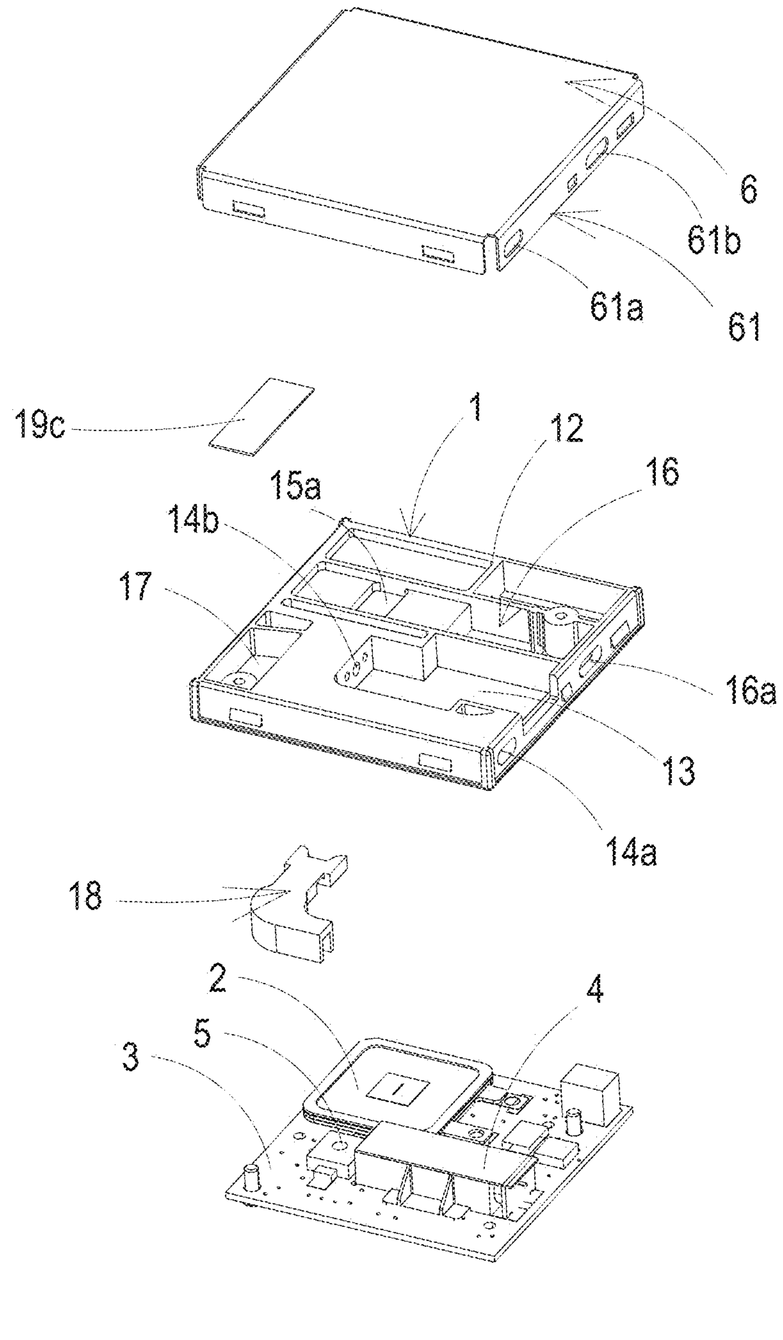
FIG. 2 is a schematic exploded view illustrating the particle detecting module of the present disclosure.

Please refer to FIG. 6 and FIG. 7, the stray light suppression treatment structure **19*a* is coated with a low-reflective material on a side wall of the gas-inlet groove 14. The stray light suppression treatment structure 19*b* is coated with a low-reflective material on the light trapping structure 17*a* with an oblique cone surface and the side frame 17*b* of the light trapping region 17. In some embodiment, a baffle 19*c* (as shown in FIG. 2) is provided on the light trapping region 17 for covering the stray light suppression treatment structure 19*b*. Consequently, when the light beam emitted from the laser component 4 is reflected to the light trap region 17 and the gas-inlet groove 14, the anti-scatter structure 18 and the two stray light suppression treatment structures 19*a*, 19*b* reduce the stray light directly reflected to the particulate sensor 5** to prevent detection distortion.

From the above descriptions, the present disclosure provides a detection accuracy enhancing structure of a particle detecting module. The detection accuracy enhancing structure comprises an anti-scatter structure and two stray light suppression treatment structures. The anti-scatter structure is disposed in the gas-inlet groove of the base corresponding to a projection area of the laser component. The two stray light suppression treatment structures are respectively arranged in the light trapping region and the gas-inlet groove corresponding to the projection area of the laser component. It benefits that the scattered light spots of the suspended particles are easily to be received and calculated by the particulate sensor for obtaining related information about the sizes and the concentration of the suspended particles contained in the gas. Consequently, the detection accuracy is improved without distortion. It is helpful of improving the detection efficiency of the particulate sensor. The present disclosure includes the industrial applicability and the inventive steps.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A detection accuracy enhancing structure of a particle detecting module, wherein the particle detecting module comprises a base, a piezoelectric actuator, a driving circuit board, a laser component, a particulate sensor and an outer cover, wherein the base has a gas-inlet groove, a gas-outlet groove, and a light trapping region, wherein an inlet path is defined by the gas-inlet groove and an outlet path is defined by the gas-outlet groove, and the light trapping region is spatially corresponding to a light beam path emitted from the laser component, and two transparent windows are located on two lateral walls of the gas-inlet groove and are spatially corresponding to the light beam path, so that the light beam emitted from the laser component passes through the two transparent windows and enters the light trapping region, and the detection accuracy enhancing structure is characterized by comprising:

an anti-scatter structure disposed in the gas-inlet groove of the base corresponding to a projection area of the laser component, wherein the anti-scatter structure has a shrink opening at a front end, and a channel having a reflective structure corresponds to the particulate sensor, wherein the particulate sensor is disposed on the anti-scatter structure; and two stray light suppression treatment structures respectively arranged in the light trapping region and the gas-inlet groove corresponding to the projection area of the laser component, wherein when the light beam emitted from the laser component is reflected to the light trap region and the gas-inlet groove, the anti-scatter structure and the two stray light suppression treatment structures reduce a stray light directly reflected to the particulate sensor to prevent detection distortion.

2. The detection accuracy enhancing structure of the particle detecting module according to claim 1, wherein, the shrink opening is for accelerating the transportation and guidance of gas from the gas-inlet groove, and concentrating the suspended particles contained in the gas to pass a direction perpendicular to the gas-inlet groove and the light beam path emitted from the laser component passing through the transparent window, wherein the reflective structure facilitates to reflect the suspended particles contained in the gas to the surface of the particulate sensor, so that the scattered light spots of the suspended particles are easily to be received and calculated by the particulate sensor for obtaining related information about the sizes and the concentration of the suspended particles contained in the gas.

3. The detection accuracy enhancing structure of the particle detecting module according to claim 1, wherein the stray light suppression treatment structure arranged in the gas-inlet groove is coated with a low-reflective material on a side wall of the gas-inlet groove.

4. The detection accuracy enhancing structure of the particle detecting module according to claim 1, wherein the light trapping region has a light trapping structure with an oblique cone surface and a side frame, and the stray light suppression treatment structure arranged in light trapping region is coated with a low-reflective material on the light trapping structure with an oblique cone surface and the side frame, and a baffle is provided on the light trapping region for covering the stray light suppression treatment structure.

* * * * *